Feb. 28, 1933.　　　G. C. THOMAS, JR　　　1,899,365
GROUNDING BUSHING
Filed Nov. 27, 1931
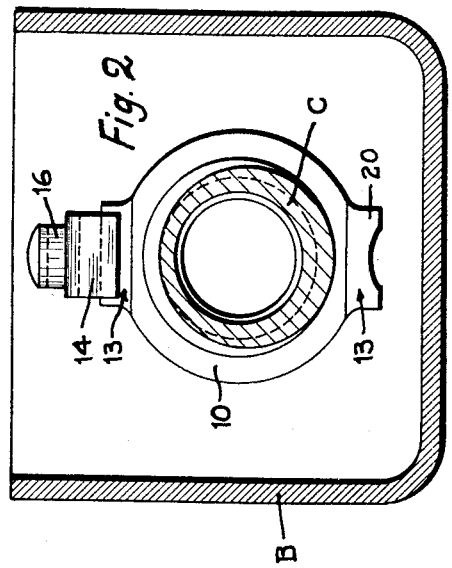
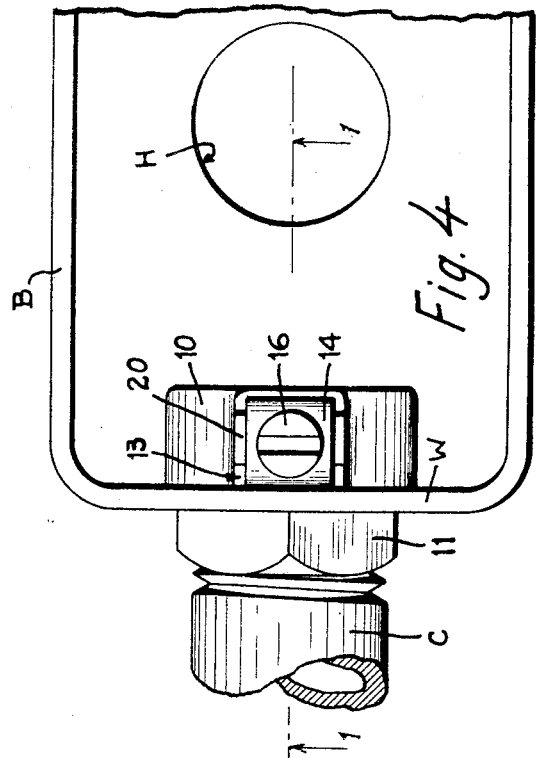
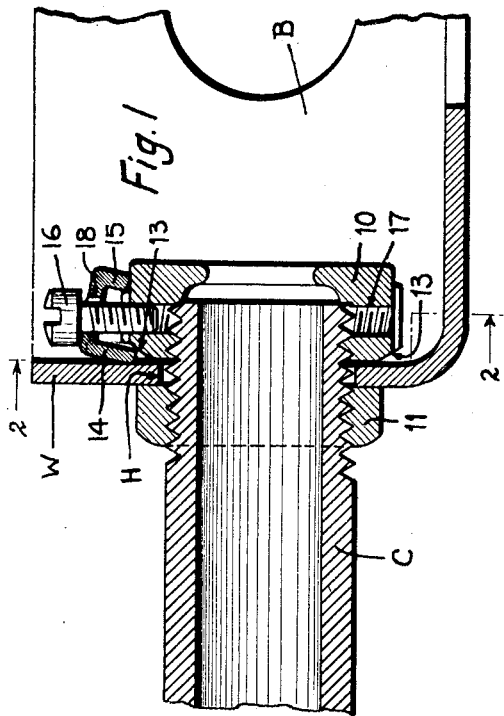
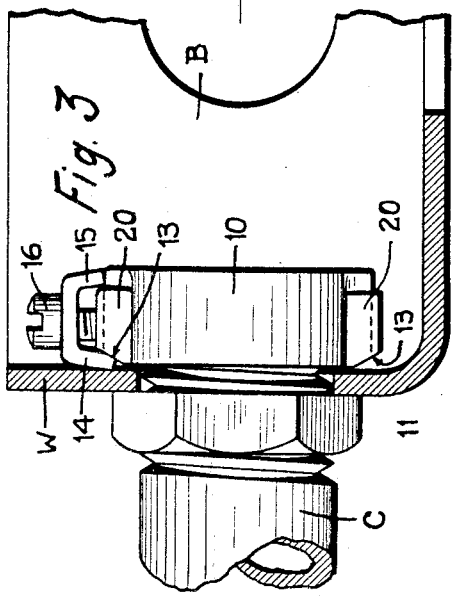
INVENTOR
GEORGE C. THOMAS JR.
BY
Bohleber + Ledbetter
ATTORNEYS Patented Feb. 28, 1933

1,899,365

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

GROUNDING BUSHING

Application filed November 27, 1931. Serial No. 577,422.

The invention relates to a grounding device by means of which a good electrical bond may be obtained between a conduit and a perforated wall through which the conduit projects, such as the opening in an outlet box. The device pertains particularly to a construction of conduit bushing or nut by means of which the threaded end of a conduit is anchored within the opening in an outlet box through which the end of the conduit projects. The invention also pertains to an outlet box assembly by means of which a good electrical ground is obtained between the box and the conduit.

An object of the invention is to construct a grounding device or fitting which will obtain good electrical bond between an outlet box and an anchorage member for securing the end of a conduit in an outlet box by a new and novel construction.

Another object of the invention is to construct a grounding device in which a wedging surface is provided upon the face of a threaded bushing or nut against which is forced the edge of a grounding member or means.

Other objects of the invention will be more apparent from the following description, taken in connection with the accompanying drawing, showing the preferred embodiment of the invention, in which:

Figure 1 is a cross-section through the grounding device mounted upon the threaded end of a conduit anchored within an outlet box also shown in section.

Figure 2 is a cross-section taken on line 2—2 of Figure 1 and showing the face of the conduit nut with a tapered surface thereon engaged by the end or edge of the wedging means or member.

Figure 3 is a cross-section through the outlet box with a conduit mounted therein and showing the grounding device jammed into the wedging recess between the bushing and the wall of the outlet box.

Figure 4 is a top view of the grounding fitting looking down upon the wedging means and the operating screw.

It is essential in any conduit wiring system that the conduit box be positively grounded electrically to the conduit or conduits received in outlet openings in the wall of the box. Any grounding device for establishing an electrical bond between the box and the conduit must not be loosened under continual vibration. Again even though the conduit and box are subjected to continual vibration not sufficiently great to loosen the grounding device, the grounding device must be capable of maintaining, nevertheless, a good electrical bond irrespective of such vibration. The grounding device to be described herein is very simple and yet fulfills the requirements referred to above.

The grounding device or fitting is shown mounted upon a conduit C projecting through an outlet opening H in an outlet box B. Anchorage means, such as the bushing or nut 10 threaded upon the end of the conduit C, is provided in order to secure the conduit within the outlet opening. The anchorage means is substantially adjacent to the wall of the box in assembled position. A second bushing 11 is preferably provided to obtain an external shoulder against which the box wall is pressed by the anchorage means 10 and thereby firmly anchored within the box opening. Although the anchorage means disclosed herein is the conventional threaded nut, it is clear that any device for anchoring the end of a conduit within the outlet opening is contemplated.

A wedging surface 13 is provided upon at least one face of the bushing or nut 10 at the outer edge thereof. This wedging surface forms a wedging or taper recess between the box wall and the face of the bushing or anchorage means. A wedging member or means 14 engages the wedging surface and is forced into the wedging recess between the wedging surface 13 and the wall of the box B. The wedging member 14 is preferably a plate, the end of which is inserted within the wedging recess, and hence one edge or corner thereof engages the wedging surface 13 so that the corner scrapes the wedging surface when the plate 14 is jammed into position and the other corner or edge of the plate scrapes the wall of the box at the same time.

Preferably the wedging means or member 14 is a U-shaped element, one leg or portion 15 of which rests upon the bushing 10. A hole or recess 18 is provided in the portion of the wedging member which connects the legs and an operating screw 16 projects through the hole or recess. The screw 16 is threaded into a threaded opening 17 in the edge of the bushing 10, a plurality of which openings are provided at spaced points around the circumference of the bushing with a wedging surface 13 adjacent thereto to receive a wedging means. The leg 15 serves as a fulcrum for the wedging member or means 14 when the operating means or screw 16 is tightened in order to jam the other leg or portion 14 into the wedging recess formed between the wedging surface 13 upon the bushing 10 and the wall W of the box. The bushing 10 may be provided with a plurality of lugs 20 to receive the wedging means 14 and its operating screw 16.

Although in the preferred construction, the wedging member 14 is of U-shaped construction, it is clear that the wedging member may be of any construction which is capable of being forced and guided into the wedging recess. An angle member consisting of the wedging portion and the portion carrying the hole 18 without the fulcruming leg 15 is one of such equivalent contemplated constructions. Similarly, any form of operating means, other than the screw 16, may be utilized to jam the wedging member into the wedging recess.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing, except as indicated in the appended claims.

What is claimed is:

1. A grounding device comprising anchorage means to secure a conduit within a hole in a wall, a wedging surface upon a face of the anchorage means and extending at an acute angle with respect to the face thereof, an angular wedging means having the edge of one portion engaging the wedging surface, the other portion extending substantially parallel to the axis of the anchorage means and having a recess, and an operating screw carried by the anchorage means and passing through the recess in the wedging means to force the latter into contact with the wedging surface.

2. A grounding device comprising anchorage means to secure a conduit within a hole in a wall, a wedging surface upon a face of the anchorage means, a U-shaped wedging means having one leg of the U contacting with the wedging surface and the end of the other leg engaging the anchorage means, and operating means carried by the anchorage means and engaging the wedging means to force the latter into contact with the wedging surface.

3. A grounding device comprising anchorage means to secure a conduit within a hole in a wall, a wedging surface upon a face of the anchorage means, a U-shaped wedging means having one leg of the U contacting with the wedging surface and the end of the other leg engaging the anchorage means, the U-shaped wedging means having a recess in the connecting portion, and a screw carried by the anchorage means and engaging the U-shaped wedging means to force the latter into contact with the wedging surface.

4. A grounding device comprising a threaded conduit bushing to secure the threaded end of a conduit within a hole in a wall, a wedging surface upon a face of the bushing, a U-shaped wedging means having one leg of the U contacting with the wedging surface and the end of the other leg engaging the bushing, the U-shaped wedging means having a recess in the connecting portion, and a screw carried by the bushing and engaging within the recess upon the U-shaped wedging means to force the latter into contact with the wedging surface.

5. An outlet box assembly comprising a box having an opening therein, a conduit projecting therethrough, a bushing threaded upon the end of the conduit substantially contacting with the wall to secure the conduit in the opening, a wedging surface upon the face of the bushing forming a wedging recess between the face of the bushing and the wall, a U-shaped wedging plate having one end inserted within the wedging recess and the other end engaging the bushing, and operating means carried by the bushing and engaging the U-shaped wedging plate to force the latter into the wedging recess and wedge it between the wall and the wedging surface.

6. An outlet box assembly comprising a box having an opening therein, a conduit projecting therethrough, a bushing threaded upon the end of the conduit substantially contacting with the wall to secure the conduit in the opening, a wedging surface upon the face of the bushing forming a wedging recess between the face of the bushing and the wall, an angular wedging plate having the end of one portion inserted within the wedging recess, a recess in the other portion of the wedging plate, and an operating screw carried by the bushing and passing through the recess in the wedging plate to force the latter into the wedging recess and wedge it between the wall and the wedging surface.

7. An outlet box assembly comprising a box having an opening therein, a conduit projecting therethrough, a bushing threaded upon the end of the conduit substantially contacting with the wall to secure the conduit in the opening, a wedging surface upon the face of the bushing forming a wedging recess between the face of the bushing and the wall, a U-shaped wedging plate having one end inserted within the wedging recess and the other end engaging the bushing, the connecting portion of the U-shaped wedging plate having a hole therethrough, and an operating screw carried by the bushing and passing through the hole in the U-shaped wedging plate to force the latter into the wedging recess and wedge it between the wall and the wedging surface.

In testimony whereof I affix my signature.

GEORGE C. THOMAS, Jr.